US011035482B2

(12) United States Patent
Follett

(10) Patent No.: US 11,035,482 B2
(45) Date of Patent: Jun. 15, 2021

(54) PRESSURE RELIEF VALVE

(71) Applicant: Scott Dale Follett, Blytheville, AR (US)

(72) Inventor: Scott Dale Follett, Blytheville, AR (US)

(*) Notice: Subject to any disclaimer, the term of this patent is extended or adjusted under 35 U.S.C. 154(b) by 37 days.

(21) Appl. No.: 16/263,392

(22) Filed: Jan. 31, 2019

(65) Prior Publication Data

US 2020/0248827 A1    Aug. 6, 2020

(51) Int. Cl.
*F16K 17/06* (2006.01)
*F16K 37/00* (2006.01)

(52) U.S. Cl.
CPC .............. *F16K 17/06* (2013.01); *F16K 37/00* (2013.01); *F15B 2211/329* (2013.01); *F15B 2211/50518* (2013.01); *Y10T 137/7929* (2015.04); *Y10T 137/7933* (2015.04); *Y10T 137/7939* (2015.04)

(58) Field of Classification Search
CPC ......... Y10T 137/7929; Y10T 137/7939; Y10T 137/7933; Y10T 137/86702; Y10T 137/8671; F16K 17/06; F16K 37/00; F15B 2211/329; F15B 2211/50518
See application file for complete search history.

(56) References Cited

U.S. PATENT DOCUMENTS

| | | | | |
|---|---|---|---|---|
| 2,424,331 A * | 7/1947 | Rose | .................... | B60T 13/141 303/54 |
| 3,011,506 A * | 12/1961 | Schwartz | .............. | F15B 13/022 137/115.16 |
| 3,015,316 A * | 1/1962 | Thomas | .................. | F15B 13/01 91/420 |
| 3,665,810 A * | 5/1972 | Parrett | ..................... | F15B 13/01 91/420 |
| 3,792,715 A * | 2/1974 | Parrett | ..................... | F15B 13/01 137/493 |
| 3,955,478 A * | 5/1976 | Feucht | ..................... | B25D 9/12 92/85 B |
| 4,223,693 A * | 9/1980 | Kosarzecki | ............. | F15B 13/01 137/106 |
| 4,336,826 A * | 6/1982 | Grawunde | ........... | F15B 21/047 137/540 |
| 4,346,733 A * | 8/1982 | Grawunde | ............. | F15B 13/01 137/454.5 |
| 4,433,615 A * | 2/1984 | Vick | ....................... | F15B 13/01 137/106 |

(Continued)

*Primary Examiner* — Marina A Tietjen
*Assistant Examiner* — Frederick D Soski
(74) *Attorney, Agent, or Firm* — Dunlap Bennett & Ludwig, PLLC; Anna Kinney

(57) ABSTRACT

A pressure relief valve includes a housing, a poppet, and a spring. The housing includes an internal bore defined along a longitudinal axis of the housing and extending from an upper portion to a lower portion. A ledge or seat is defined within the bore. At least one lower portion hole is defined from an outer surface of the lower portion and into the bore. At least one upper portion hole is defined from an outer surface of the upper portion and into the bore. The poppet is slidably engaged within the internal bore. The poppet includes a head, a shaft, and an internal channel that runs longitudinally through the entire poppet. The head includes a shoulder. The spring is disposed within the bore at the upper portion of the housing and biases the poppet downwards so that the shoulder abuts the ledge or seat.

10 Claims, 4 Drawing Sheets

(56) References Cited

U.S. PATENT DOCUMENTS

| | | | | |
|---|---|---|---|---|
| 4,433,703 A * | 2/1984 | Jenkins | F16K 15/18 | 137/360 |
| 4,520,625 A * | 6/1985 | Sato | F15B 13/02 | 60/464 |
| 4,541,455 A * | 9/1985 | Hauser | F16K 24/04 | 137/516.27 |
| 4,658,856 A * | 4/1987 | Gonzi | F15B 20/00 | 137/493.8 |
| 4,727,792 A * | 3/1988 | Haussler | F15B 13/01 | 137/493.3 |
| 4,790,348 A * | 12/1988 | Gausman | F16K 17/04 | 137/516.29 |
| 4,836,240 A * | 6/1989 | Elliott | F16K 17/06 | 137/454.5 |
| 5,241,986 A * | 9/1993 | Yie | B05B 1/306 | 137/512 |
| 5,309,936 A * | 5/1994 | Christensen | F15B 13/01 | 137/106 |
| 5,333,451 A * | 8/1994 | Sakikawa | F16H 61/40 | 137/494 |
| 5,546,980 A * | 8/1996 | Kosarzecki | F16K 27/02 | 137/454.5 |
| 5,588,294 A * | 12/1996 | Sakakura | F16H 39/06 | 60/464 |
| 5,918,635 A * | 7/1999 | Wang | F16K 31/0693 | 137/625.65 |
| 6,006,782 A * | 12/1999 | Felton | F02M 59/462 | 137/513.3 |
| 6,131,610 A * | 10/2000 | Morisako | F15B 13/01 | 137/601.19 |
| 6,899,113 B2 * | 5/2005 | Parrish | F16K 47/08 | 137/1 |
| 7,011,290 B2 * | 3/2006 | Rodrigues | B05B 1/306 | 251/63.5 |
| 7,225,830 B1 * | 6/2007 | Kershaw | F16K 17/06 | 137/512.1 |
| 2006/0196553 A1 * | 9/2006 | Kane | F16K 15/026 | 137/538 |
| 2007/0137711 A1 * | 6/2007 | Krebs | F16K 15/025 | 137/454.5 |
| 2008/0115848 A1 * | 5/2008 | Bruck | F16K 17/105 | 137/613 |
| 2008/0245427 A1 * | 10/2008 | Williams | F16K 31/0627 | 137/625.25 |
| 2012/0211686 A1 * | 8/2012 | Okamoto | F16K 31/0624 | 251/129.15 |
| 2014/0048148 A1 * | 2/2014 | Martin | F16K 17/196 | 137/15.19 |
| 2015/0107702 A1 * | 4/2015 | Lu | F16K 17/063 | 137/540 |
| 2015/0268669 A1 * | 9/2015 | Vogt | G05D 7/0635 | 137/486 |
| 2015/0369262 A1 * | 12/2015 | Kubo | F16K 31/122 | 137/565.01 |
| 2016/0053906 A1 * | 2/2016 | Marrucci | G05D 16/10 | 137/489 |
| 2016/0178079 A1 * | 6/2016 | Schneider | F16K 27/029 | 137/798 |
| 2016/0326721 A1 * | 11/2016 | Lim | F15B 13/026 | |
| 2016/0363229 A1 * | 12/2016 | Thompson | F16K 17/048 | |
| 2017/0159834 A1 * | 6/2017 | Jeon | B60T 8/341 | |
| 2018/0180192 A1 * | 6/2018 | Jamison | H01F 7/1607 | |

* cited by examiner

PRESSURE RELIEF VALVE

BACKGROUND OF THE INVENTION

The present invention relates to a pressure relief valve and, more particularly, to an improved direct acting pressure relief valve having improved reaction times.

A relief valve or pressure relief valve (PRV) is a type of safety valve used to control or limit the pressure in a system; pressure might otherwise build up and create a process upset, instrument or equipment failure, or catastrophic, uncontrolled release of pressure. The pressure is relieved by allowing the pressurized fluid to flow through an auxiliary passage to the system's reservoir, commonly referred to as "tank".

Direct acting pressure relief valves require relatively large poppets and heavy springs to counter the pressure in the hydraulic system. Both the large poppet and heavy spring have the effect of slowing the operation of the valve. Therefore, the reaction time of direct operated pressure relief cartridge valves in hydraulic systems are relatively slow and may not prevent mechanical failures. Pilot operated pressure relief valves have a faster response time but have complicated designs and many more parts than direct acting relief valves. Hydraulic system designers must use the costlier pilot operated valves if response time is critical.

As can be seen, there is a need for an improved direct acting pressure relief valve having quicker reaction times.

SUMMARY OF THE INVENTION

In one aspect of the present invention, a pressure relief valve comprises: a housing comprising an upper portion, a lower portion, and an internal bore defined along a longitudinal axis of the housing and extending from the upper portion to the lower portion, wherein a ledge or seat is defined within the bore in between the upper portion and the lower portion, at least one lower portion hole is defined from an outer surface of the lower portion and into the bore and at least one upper portion hole is defined from an outer surface of the upper portion and into the bore; a poppet slidably engaged within the internal bore, the poppet comprising a head and a shaft, wherein the head comprises a shoulder; and a spring disposed within the bore at the upper portion of the housing and biasing the poppet downwards so that the shoulder abuts the ledge, wherein a threshold pressure exerted against the shoulder through the at least one lower portion hole urges the poppet upwards against the bias of the spring so that pressure is released through the at least one upper portion hole.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a direct operated hydraulic pressure relief cartridge valve with counter-balanced poppet. The present invention significantly reduces the reaction time to relieve spikes in pressure in hydraulic systems. The present invention may include a significant reduction of weight of the poppet and spring force to a point where the reaction is comparable to pilot operated valve poppet and spring.

Figure 1:
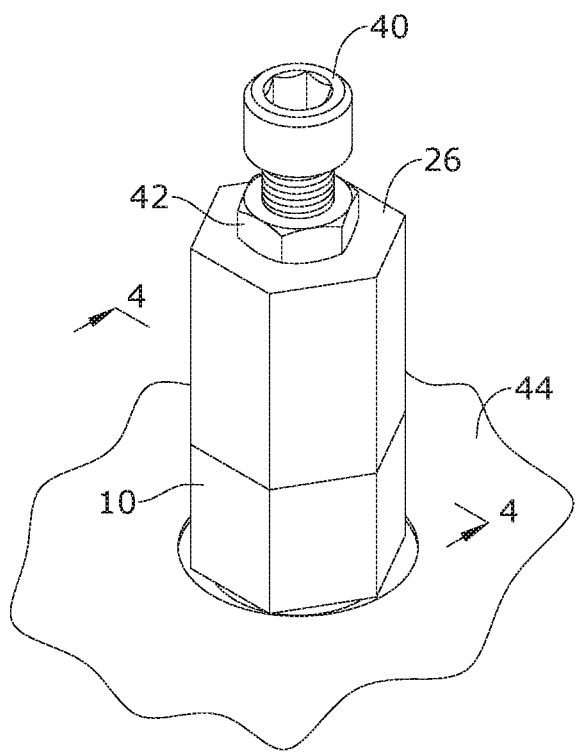
FIG. 1 is a perspective view of an embodiment of the present invention, shown in an installed position.
Figure 2:
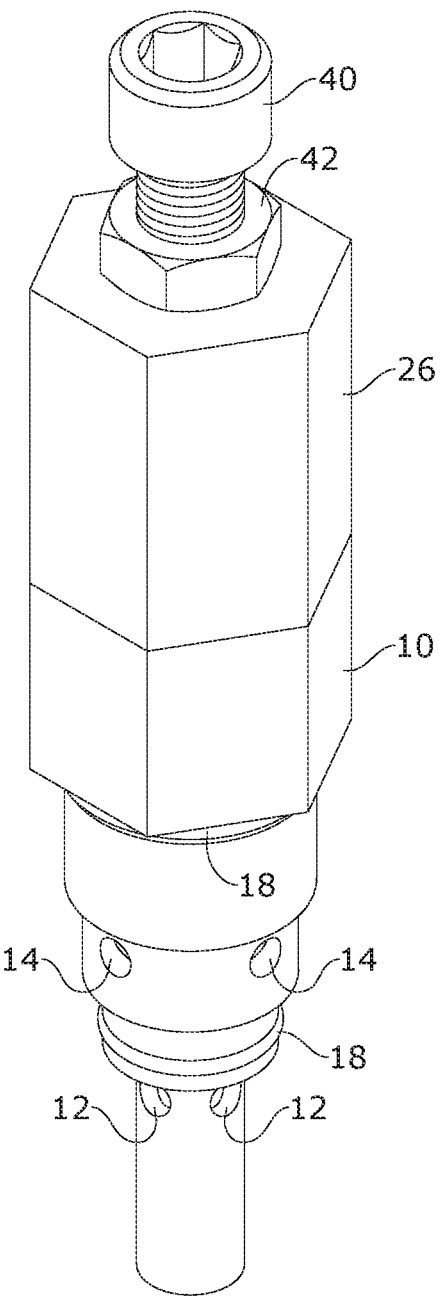
FIG. 2 is a perspective view of an embodiment of the present invention.
Figure 3:
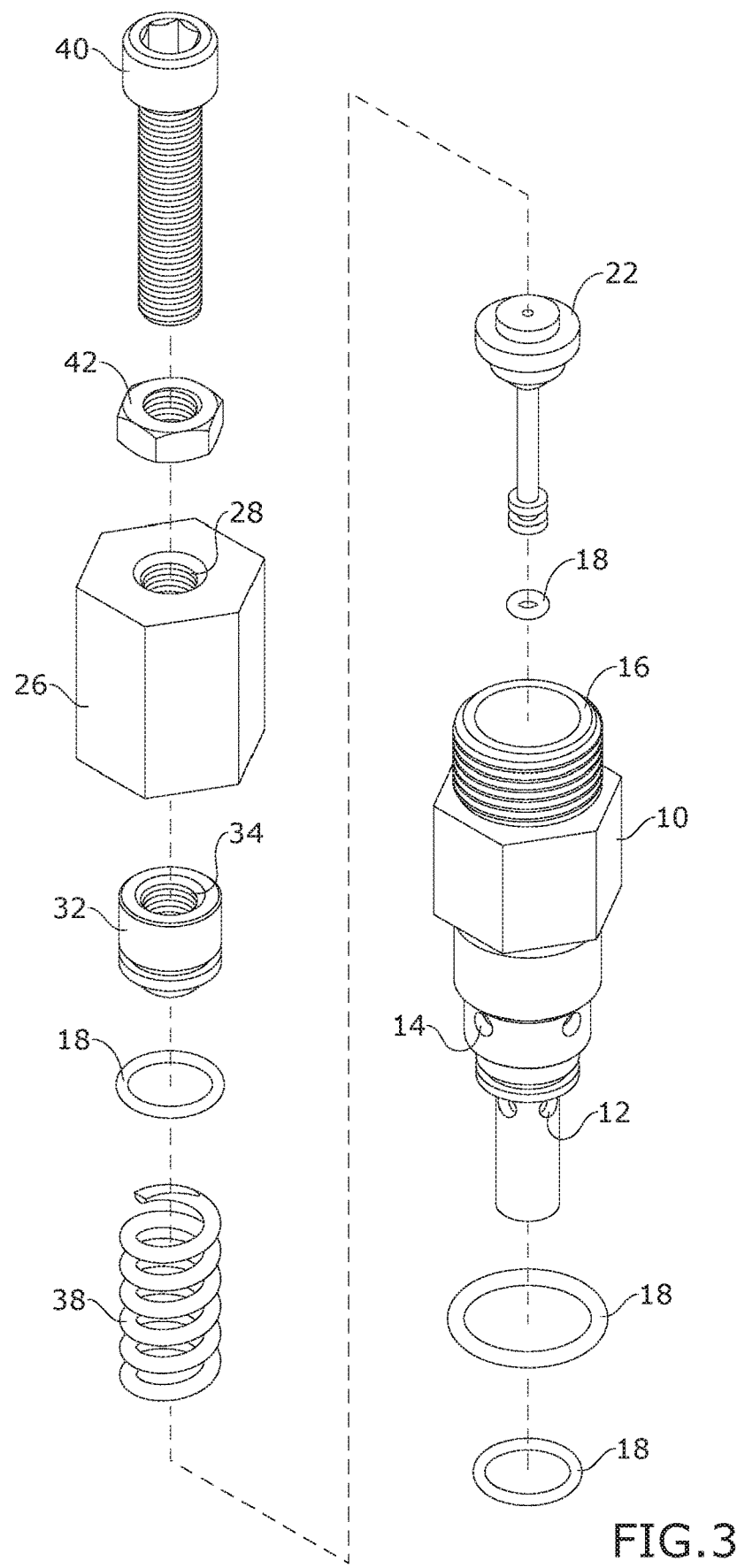
FIG. 3 is an exploded view of an embodiment of the present invention.
Figure 4:
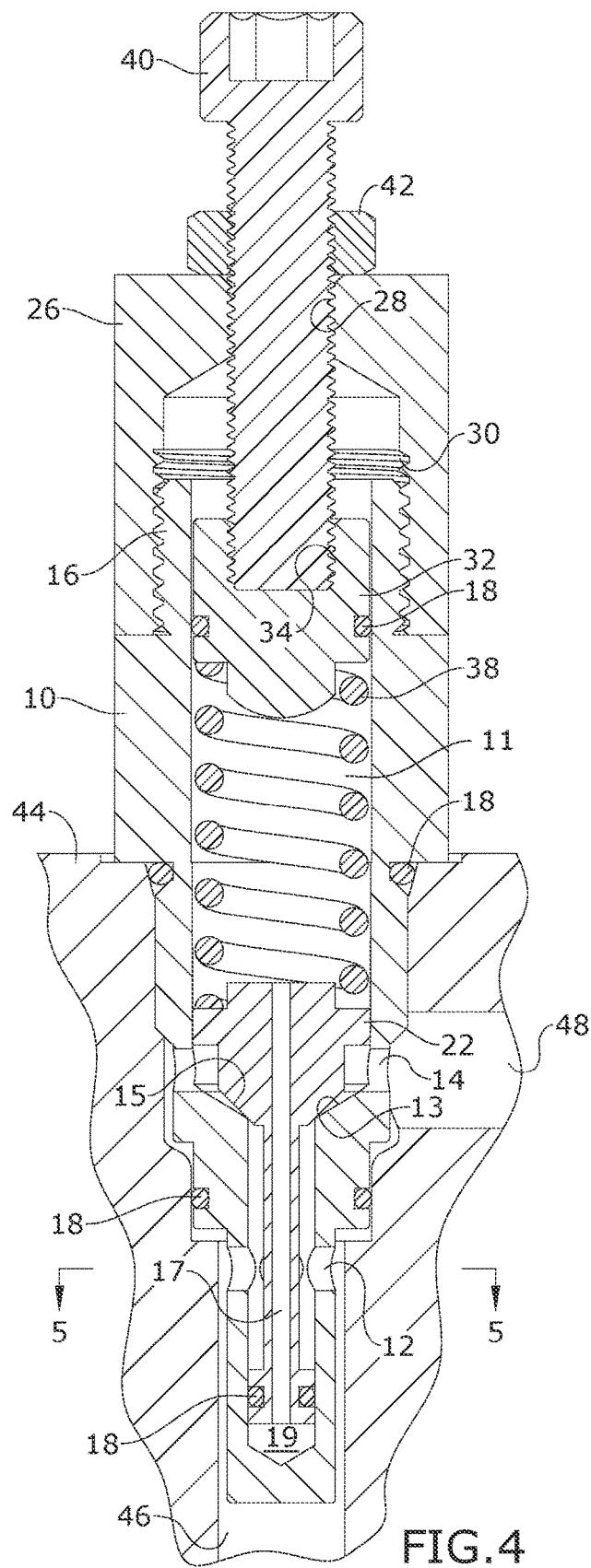
FIG. 4 is a section view of the present invention, taken along line 4-4 in FIG. 1.
Figure 5:
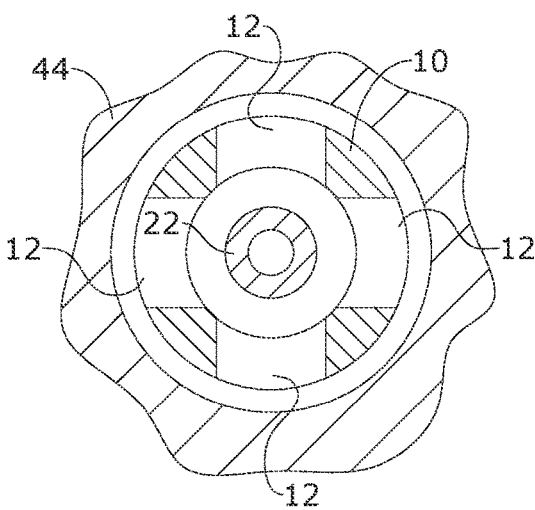
FIG. 5 is a section view of the present invention, taken along line 5-5 in FIG. 4.
Figure 6:
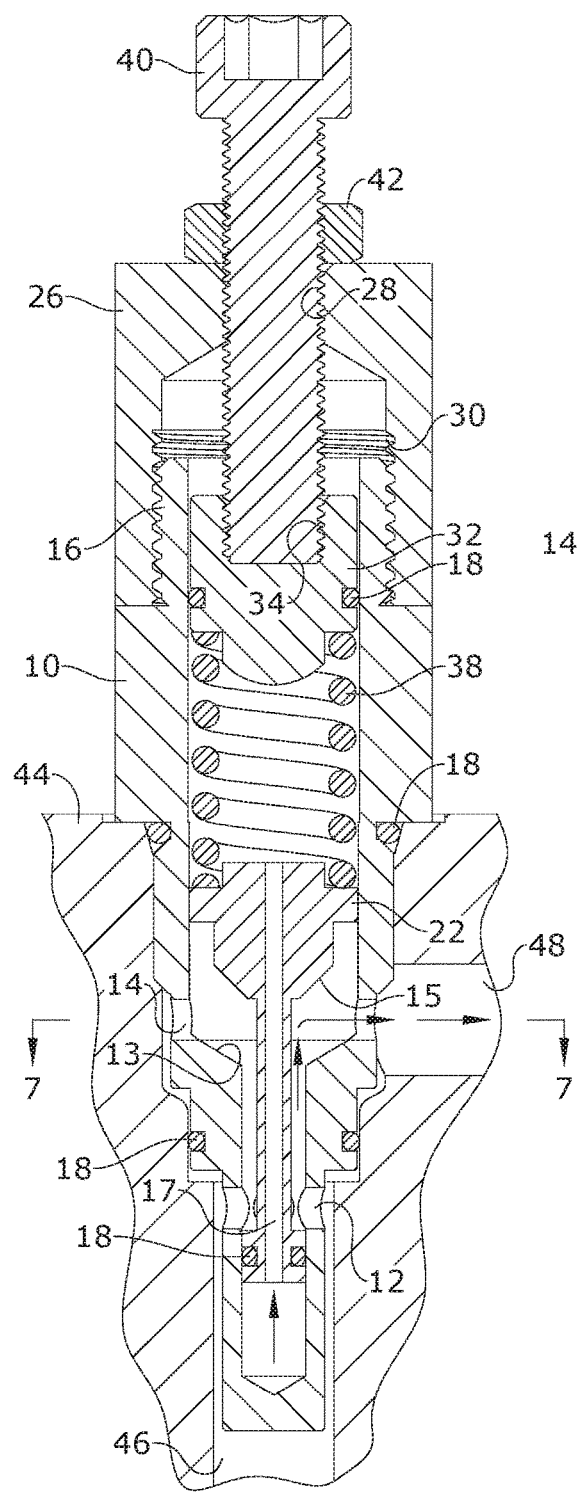
FIG. 6 is a section view of an embodiment of the present invention, illustrating a poppet raising under increased pressure.
Figure 7:
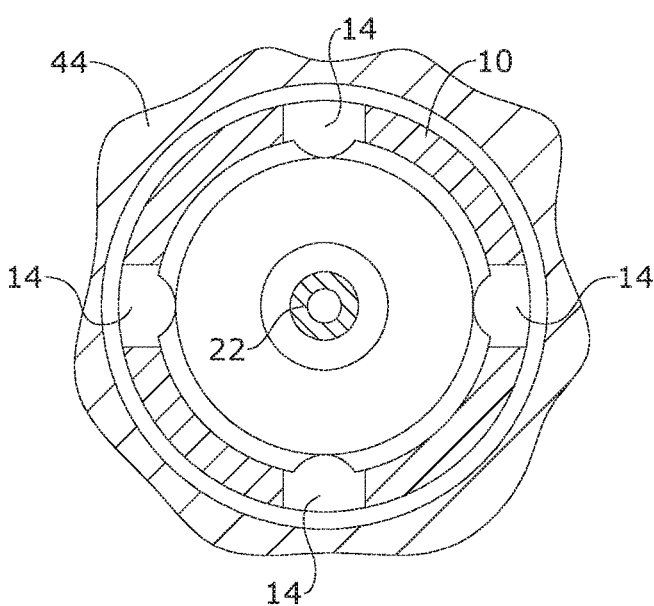
FIG. 7 is a section view of the present invention, taken along line 7-7 in FIG. 6.

Referring to FIGS. 1 through 7, the present invention is a modified pressure relief valve. The pressure relief valve includes a housing 10, a poppet 22, and a spring 38. The housing 10 includes an upper portion, a lower portion, and an internal bore 11 defined along a longitudinal axis of the housing 10 and extending from the upper portion to the lower portion. A ledge 13 or seat is defined within the bore 11 in between the upper portion and the lower portion. At least one lower portion hole 12 is defined from an outer surface of the lower portion and into the bore. At least one upper portion hole 14 is defined from an outer surface of the upper portion and into the bore 11. The poppet 22 is slidably engaged within the internal bore 11. The poppet 22 includes a head and a shaft. The head includes a shoulder 15. The spring 38 is disposed within the bore 11 at the upper portion of the housing 10 and biases the poppet 22 downwards so that the shoulder 15 abuts the ledge 13.

The shoulder 15 may include a male frusto-conical shape and the ledge 13 may include a female frusto-conical shape. The bore 11 of the present invention may define a cylinder shape and may include a larger diameter at the upper portion and a smaller diameter at the lower portion. The head of the poppet 22 may include a larger diameter than the bore 11 at the lower portion and the shaft may include a smaller diameter than the bore 11 at the lower portion. The shaft of the poppet 22 is disposed within the bore at the lower portion. Pressure is thereby exerted along an entire lower edge of the head, allowing the poppet 22 to raise at a faster pace. When a threshold pressure is exerted against the shoulder 15 through the at least one lower portion hole 12, the poppet 22 is urged upwards against the bias of the spring 38 so that pressure is released through the at least one upper portion hole 14.

In certain embodiments, the at least one upper portion hole 14 includes a plurality of upper portion holes 14 circumferentially disposed around the housing 10. In certain embodiments, the at least one lower portion hole 12 is a plurality of lower portion holes 12 circumferentially disposed around the housing 10. The holes 12, 14 may be evenly spaced apart. Therefore, an even amount of pressure may be exerted against the shoulder 15 and released through the upper portion holes 14. In certain embodiments, the poppet 22 includes a channel 17 defined along a longitudinal axis of the poppet 22. The channel 17 terminates at a top opening at a top of the head and a bottom opening at a bottom of the shaft. Pressure on the opposite ends of the poppet 22 are equalized due to the channel 17, thereby equalizing pressure between the upper portion of the bore 11 and a reservoir 19 at a distal end of the bore 11.

In certain embodiments, a tension of the spring 38 is adjustable. In such embodiments, the present invention may include a cap 26 having bottom opening and a top opening. The bottom opening includes female threading 30 mechanically fastened to male threading 16 of the housing 10. The top opening of the cap 26 includes female threading 28. An adjustment screw 40 includes male threading mechanically engaged with the female threading 28 of the top opening. A jam nut 42 is mechanically engaged with the adjustment screw 40 and is disposed above the cap 36. An adjustment seal 32 is disposed between the end of the adjustment screw 40 and the spring 38. An end of the adjustment screw 40 may be mechanically fastened to female threads 34 of the adjustment seal 32. Rotating the adjustment screw 40 within the top opening adjusts the tension of the spring 38.

As mentioned above, the poppet 22 fits into the housing 10. The fit creates a metal to metal seal which contains the hydraulic system pressure. The spring 38 provides the force that holds the poppet 22 in position. The cap 26, adjustment seal 32, adjustment screw 40, and jam nut 42 set and hold the desired release pressure. The O-rings 18 prevent leakage across the various components.

The valve housing 10 screws into a standard hydraulic cartridge valve cavity 46 of a hydraulic system pipe 44. The system fluid enters the valve through the holes 12 of the housing 10. The hydraulic system pressure pushes on both the bottom of the shaft and the shoulder 15 of the poppet 22. Pressure on the opposite ends of the poppet 12 is equalized by the channel 17 that runs lengthwise in the poppet 12. There is a small differential in the area exposed to the pressure. The spring 38 seats the poppet 12 against the housing 10 which results in a metal to metal seal. When the hydraulic system pressure results in force that is greater than the force of the spring 38, the metal to metal seal separates and hydraulic pressure is relieved to the system's reservoir 48. When the hydraulic system pressure decreases, the spring 38 reseats the poppet 12.

It should be understood, of course, that the foregoing relates to exemplary embodiments of the invention and that modifications may be made without departing from the spirit and scope of the invention as set forth in the following claims.

What is claimed is:

1. A pressure relief valve comprising:
    a housing comprising an upper portion, a lower portion, and an internal bore defined along a longitudinal axis of the housing and extending from the upper portion to the lower portion, wherein an end of the lower portion forms a closed reservoir, a ledge is defined within the bore in between the upper portion and the lower portion, at least one lower portion hole is defined from an outer surface of the lower portion and into the bore and at least one upper portion hole is defined from an outer surface of the upper portion and into the bore;
    a poppet slidably engaged within the internal bore, the poppet comprising a head and a shaft, wherein the head comprises a shoulder; and
    a spring disposed within the bore at the upper portion of the housing and biasing the poppet downwards so that the shoulder abuts the ledge, wherein
    a threshold pressure exerted against the shoulder through the at least one lower portion hole urges the poppet upwards against the bias of the spring so that pressure is released through the at least one upper portion hole wherein the poppet comprises a channel defined along a longitudinal axis of the poppet, the channel terminating at a top opening at a top of the head and a bottom opening at a bottom of the shaft; wherein the top opening opens directly into the upper housing and the bottom opening opens directly into the closed reservoir.

2. The pressure relief valve of claim 1, wherein the shoulder comprises a male frusto-conical shape and the ledge comprises a female frusto-conical shape.

3. The pressure relief valve of claim 1, wherein the bore at the upper portion comprises a larger diameter than the bore at the lower portion.

4. The pressure relief valve of claim 1, wherein the at least one upper portion hole comprises a plurality of upper portion holes circumferentially disposed around the housing.

5. The pressure relief valve of claim 1, wherein the at least one lower portion hole comprises a plurality of lower portion holes circumferentially disposed around the housing.

6. The pressure relief valve of claim 1, wherein a tension of the spring is adjustable.

7. The pressure relief valve of claim 6, further comprising:
    a cap comprising a bottom opening and a top opening, wherein the bottom opening comprises female threading mechanically fastened to male threading of the housing, and the top opening comprises female threading;
    an adjustment screw comprising male threading mechanically engaged with the female threading of the top opening, wherein
    rotating the adjustment screw within the top opening adjusts the tension of the spring.

8. The pressure relief valve of claim 7, further comprising an adjustment seal disposed between the end of the adjustment screw and the spring.

9. The pressure relief valve of claim 7, further comprising a jam nut mechanically engaged with the adjustment screw and disposed above the cap.

10. The pressure relief valve of claim 7, wherein an end of the adjustment screw abuts against the spring.

* * * * *